July 22, 1969  A. T. PARRELLA  3,456,395
ROLL GRINDING APPARATUS
Original Filed Nov. 17, 1964  10 Sheets-Sheet 1
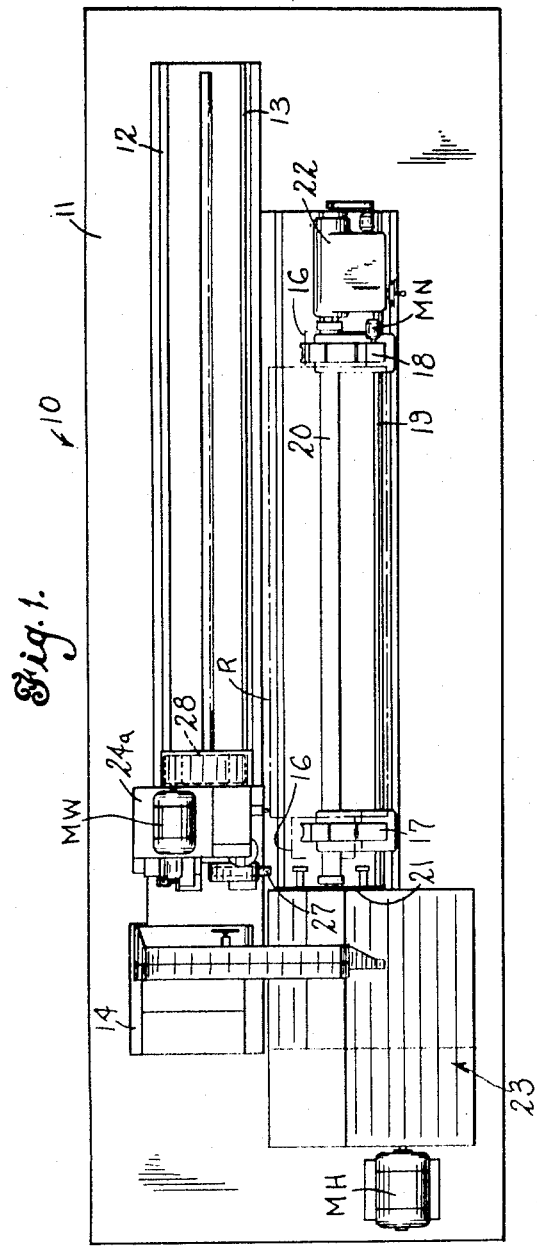
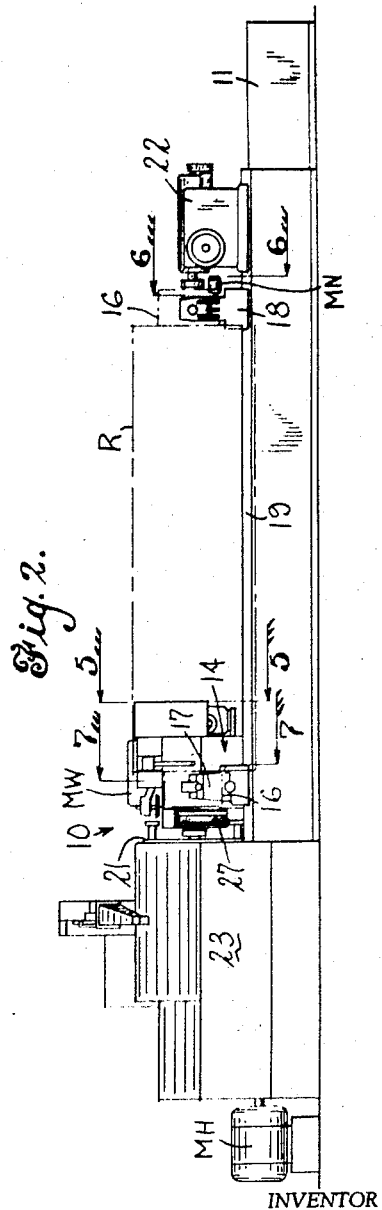
INVENTOR
Alfred T. Parrella
BY DeLio and Montgomery
ATTORNEYS July 22, 1969   A. T. PARRELLA   3,456,395
ROLL GRINDING APPARATUS
Original Filed Nov. 17, 1964   10 Sheets-Sheet 2
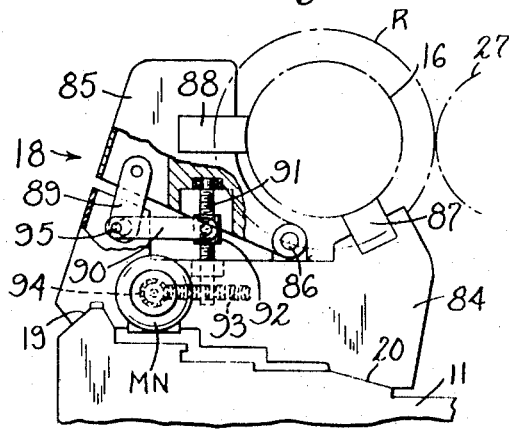
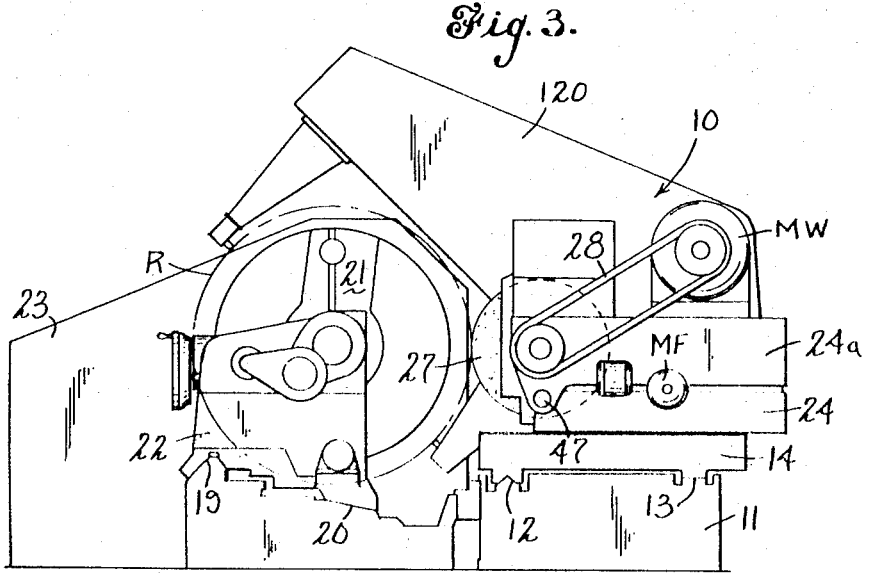
INVENTOR
Alfred T. Parrella
BY De Lio and Montgomery
ATTORNEYS INVENTOR
Alfred T. Parrella
BY De Lio and Montgomery
ATTORNEYS

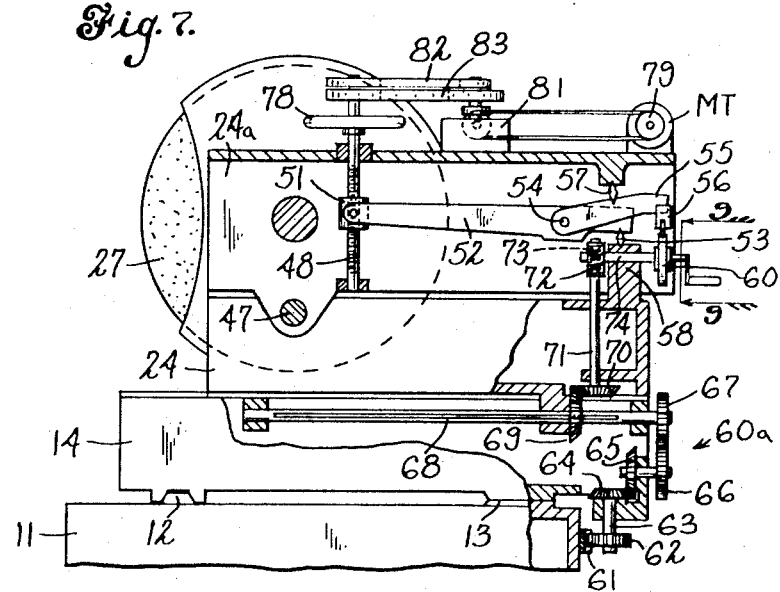
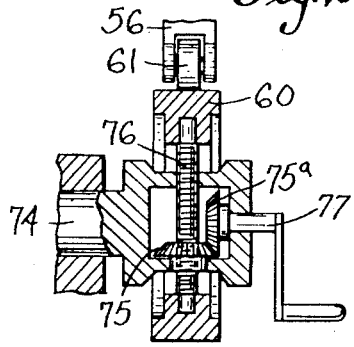
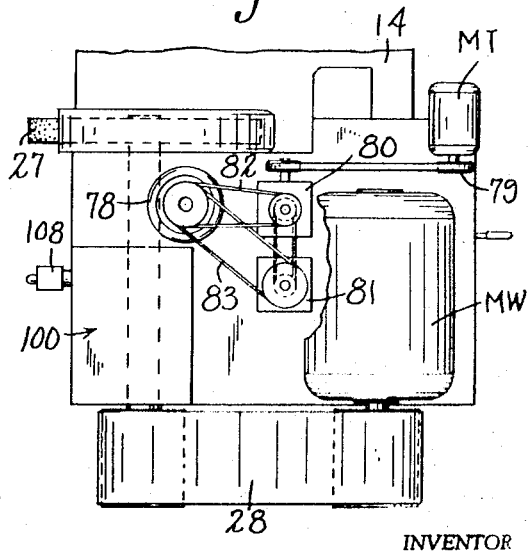
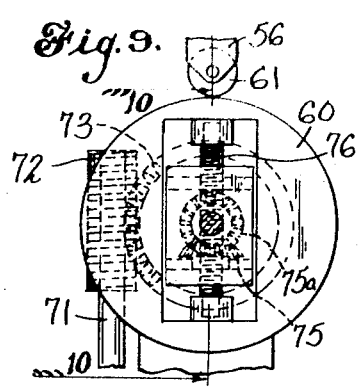

July 22, 1969     A. T. PARRELLA     3,456,395
ROLL GRINDING APPARATUS
Original Filed Nov. 17, 1964     10 Sheets-Sheet 5
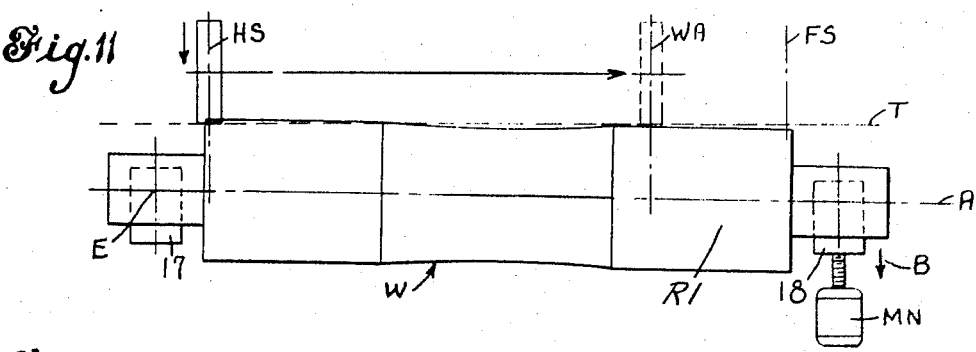
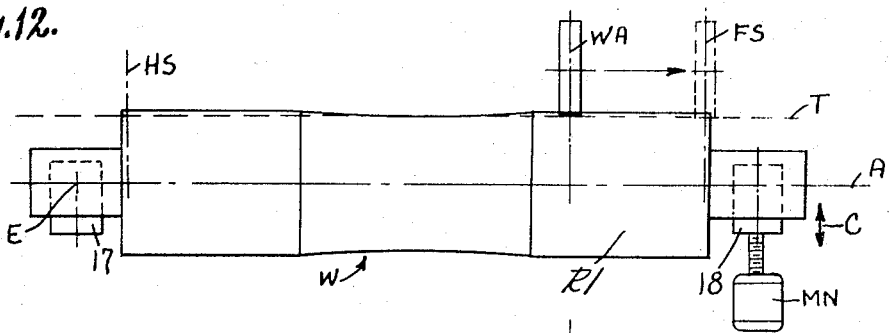
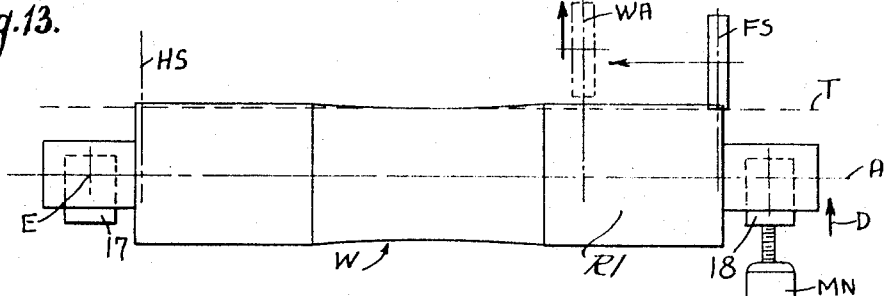
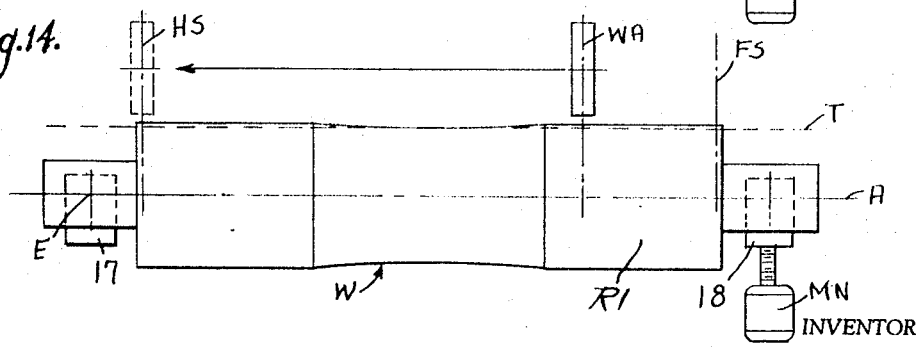
INVENTOR
Alfred T. Parrella
BY DeLio and Montgomery
ATTORNEYS

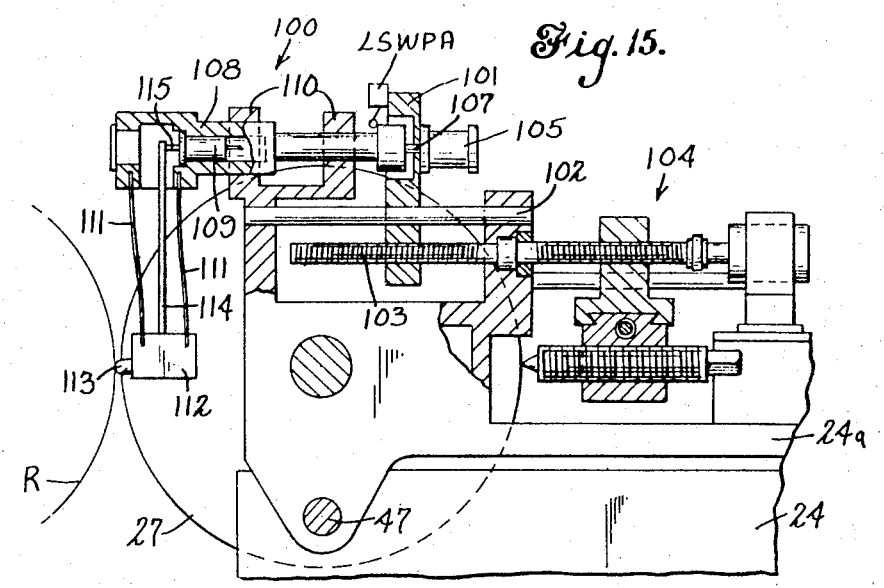
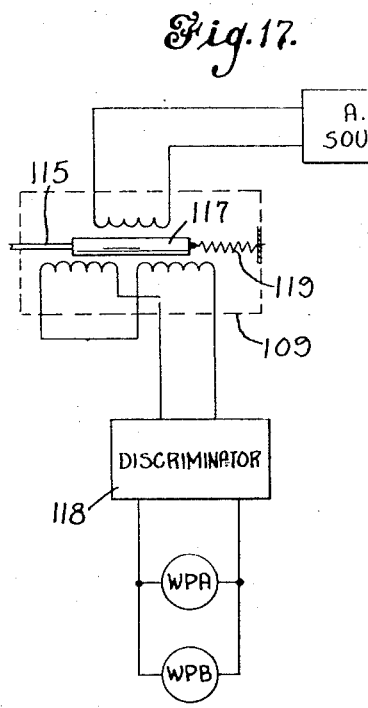
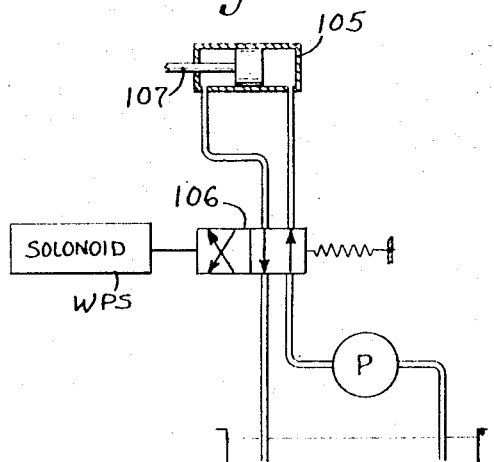
INVENTOR
Alfred T. Parrella

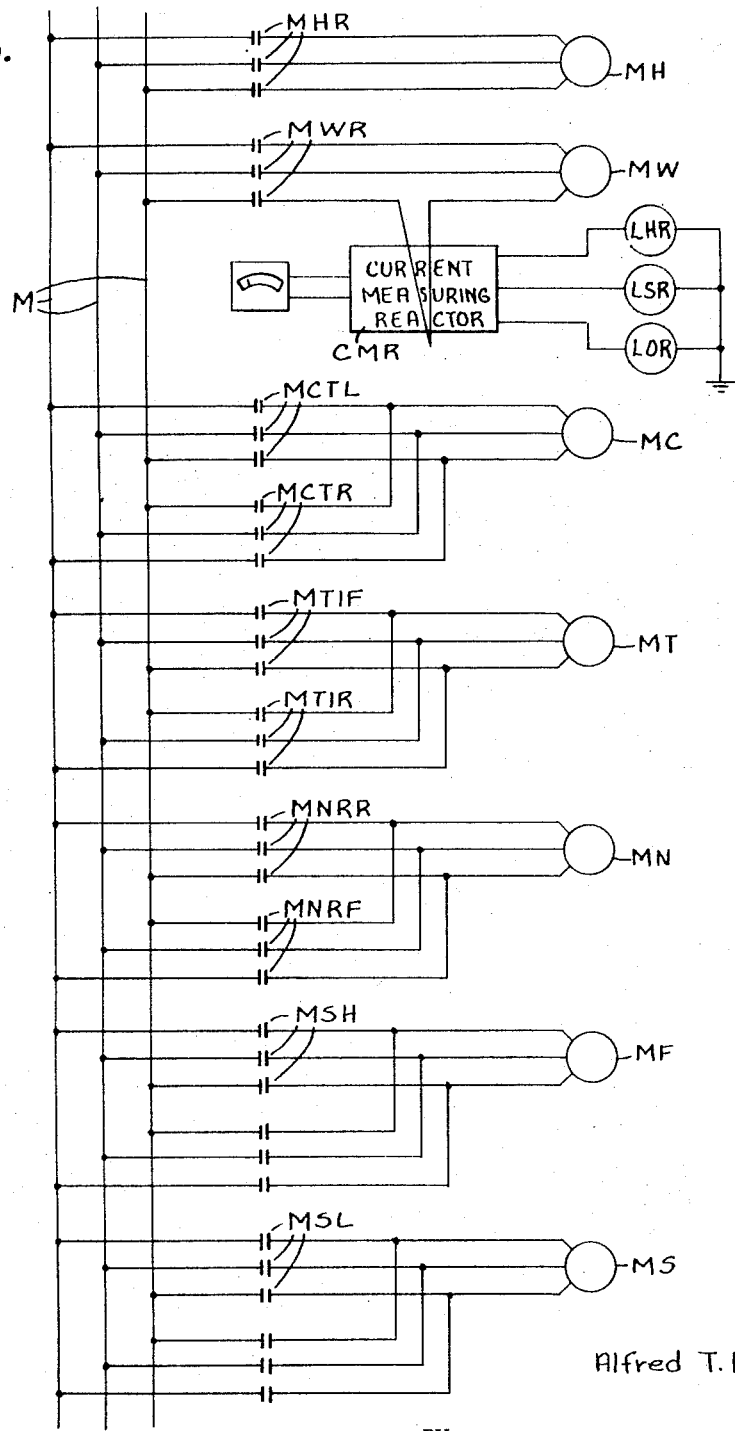

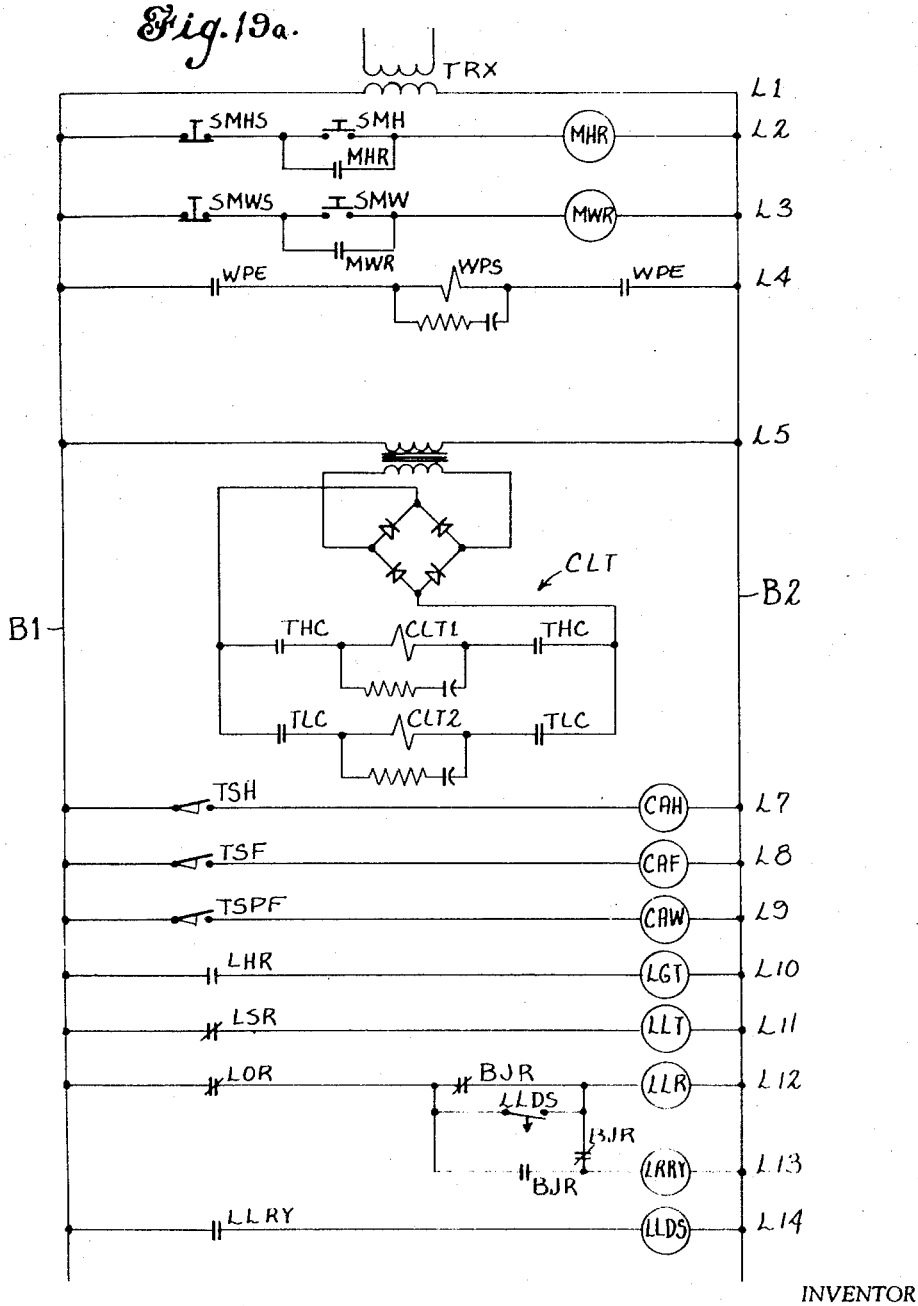

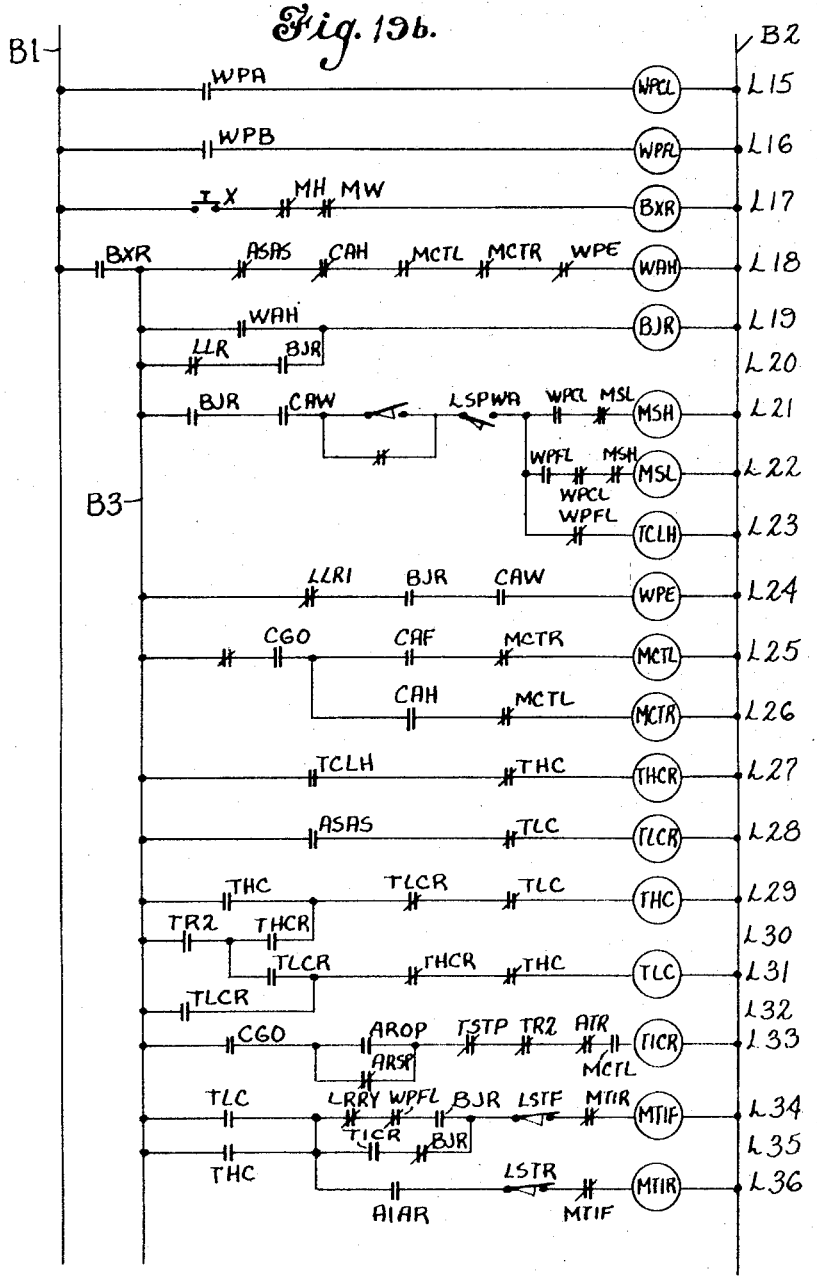

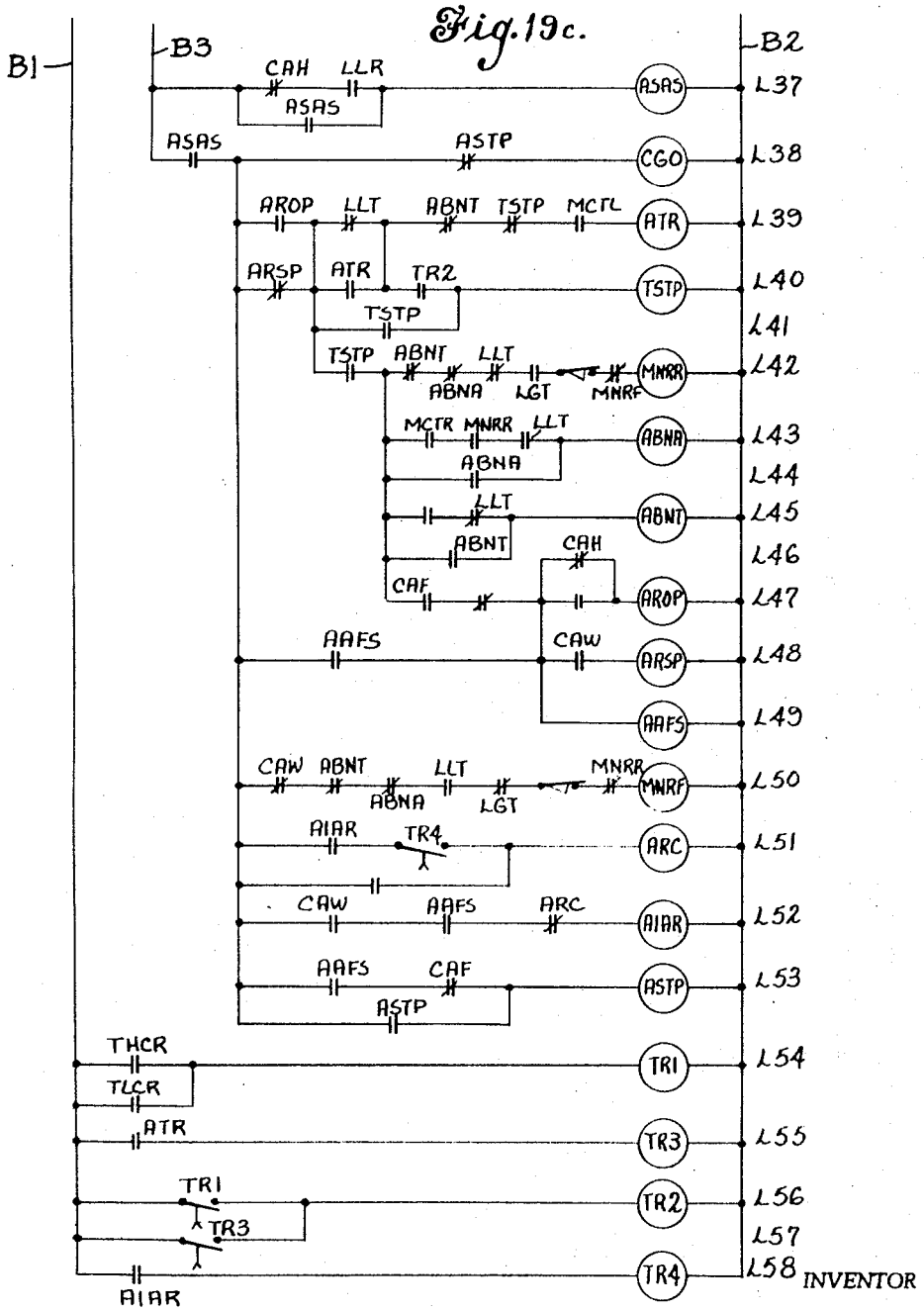

United States Patent Office 3,456,395
Patented July 22, 1969

3,456,395
ROLL GRINDING APPARATUS
Alfred T. Parrella, Newtown, Conn., assignor to Farrel Corporation, Ansonia, Conn.
Original application Nov. 17, 1964, Ser. No. 411,813, now Patent No. 3,333,370, dated Aug. 1, 1967. Divided and this application Mar. 1, 1967, Ser. No. 643,753
Int. Cl. B24b 19/00, 51/00, 5/00
U.S. Cl. 51—165    17 Claims

ABSTRACT OF THE DISCLOSURE

This disclosure relates to apparatus for aligning one side of a face of a roll to be ground with a reference line. The grinding wheel is advanced onto the roll until a predetermined pressure is established therebetween. Then the grinding wheel is traversed along the face of the roll. The roll is then regulated in its position relative to the grinding wheel so as to maintain said predetermined pressure.

---

This application is a division of co-pending application Ser. No. 411,813, filed Nov. 17, 1964, now Patent No. 3,333,370, dated Aug. 1, 1967.

This invention relates to grinding apparatus, and more particularly relates to an improved means for aligning a workpiece to be ground with respect to a reference line or axis of a grinding apparatus.

In grinding, or regrinding, a mill roll it is seldom if ever possible to initially position the roll on the grinding machine in such a manner that its axis is within a desired degree of parallelism with a reference axis or line which may be the path of travel of the grinding wheel along the length of the roll face. This difficulty in initially positioning a roll within the desired degree of parallelism is usually due to uneven wear of the roll journals or necks with respect to each other. However, it is quite important that the axis of the roll be aligned within a very small tolerance in order that the roll may be reground true to a desired contour or shape.

In a roll grinding machine there are generally provided two supports for the roll necks or journals which rotatably support the roll when it is placed in the grinding apparatus. One of these neck rest supports may be constructed with movable elements arranged to move one end of the roll substantially perpendicular to the reference axis so that the axis of the roll may be aligned with the reference axis.

When the roll is initially placed in the machine, the machine cannot recognize the degree of misalignment of the axis of the roll. Therefore, the roll must be placed in an initial position with respect to the grinding apparatus such that the degree of misalignment of the roll may be recognized by the machine, or its operator, and correction then made for the misalignment.

The present invention provides a new and improved means for aligning the axis of a roll with a reference axis of the grinding machine, and also provides new and improved means and apparatus for initially placing a roll having a taper thereon in a position with respect to a reference axis of the grinding machine so that the degree of misalignment may be recognized.

More specifically, this invention provides a new and improved means for aligning one side of a mill roll with respect to a reference axis of the grinding machine which may be accomplished either under the control of the operator or automatically in combination with new and improved automatic controls.

The present invention utilizes the grinding wheel as a gaging element to align a roll with a reference line or axis of the machine. In so utilizing the grinding wheel as a gage, the invention insures that only a minimum amount of metal is removed from the roll, and further, the alignment may be accomplished in such manner as not to impart a taper to the roll face. The invention is so arranged that only a minimum amount of time, which is quite important in a roll grinding schedule, is utilized in aligning the roll.

Briefly stated, the invention in one form thereof utilizes the grinding wheel as a measuring or gaging element to align one surface or side of the roll with the path of travel of the grinding wheel carriage. The grinding wheel is initially brought into contact with the roll at one end thereof until a predetermined grinding wheel pressure is reached as indicated by the current drawn by the grinding wheel drive motor. Thereafter, the grinding wheel carriage with the grinding wheel thereon traverses the length of the roll face, and one end of the roll (opposite the starting end) is moved about the center of support of the other end of the roll to maintain the wheel pressure on the roll substantially constant. As the grinding wheel traverses the roll face, the roll is moved outwardly if the predetermined wheel pressure is exceeded and subsequently moved inwardly until the predetermined wheel pressure is exceeded, if the wheel pressure falls below the predetermined value. Means are provided to sense the pressure of the grinding wheel of the roll through the magnitude of current drawn by the grinding wheel drive motor and in response to the value of current sensed to automatically move one end of the roll about the center of support of the other end of the roll and thereby position one side of the roll parallel with respect to the path of travel of the grinding wheel carriage. Alternatively, the movement of the movable neck rest may be placed under the control of the operator who would position the roll in accordance with wheel pressure exerted by the grinding wheel on the roll.

Accordingly, an object of this invention is to provide new and improved means for aligning the axis of a mill roll with a reference axis or line of a grinding machine upon which the roll is to be ground.

Another object of this invention is to provide a new and improved means for aligning one side of a mill roll with a reference line of a grinding machine upon which the roll is to be ground.

Another object of this invention is to provide a new and improved means for positioning a mill roll in a grinding machine so that the degree of misalignment of the axis of the roll with a reference axis of the machine may be readily recognized and corrected.

Another object of this invention is to provide new and improved controls in combination with a grinding machine which will automatically align one side of a mill roll with a reference line of the grinding machine.

Another object of this invention is to provide new and improved means, utilizing the grinding wheel as a gage for aligning a mill roll to be ground with a reference line or axis of a grinding machine.

A further object of this invention is to provide new and improved means for aligning a mill roll with a reference line of a grinding machine which utilizes the grinding wheel as a gage and only a small amount of metal is removed from the roll.

A further object of this invention is to provide a new and improved means for aligning the axis and/or one side of the face of a roll with a reference line with a grinding machine utilizing the grinding wheel as an alignment gage, which does not impart or grind a taper on the roll.

A still further object of this invention is to provide a new and improved means for aligning the axis and/or one side of the face of a roll with a reference line of a grinding machine, which is accomplished in a time-saving manner.

The features of the invention which are believed to be novel are set forth with particularity and definitely claimed in the concluding portion of this specification. However, the invention, both as to organization and operation, together with further objects and advantages thereof, may best be appreciated by reference to the following detailed description and the accompanying drawings in which:

FIG. 1 is a plan view of roll grinding apparatus embodying the features of the present invention;

FIG. 2 is a front elevation of the machine of FIG. 1;

FIG. 3 is an end view of the apparatus of FIGS. 1 and 2 as viewed from the right side;

FIG. 6 is a view seen along line 6—6 of FIG. 2 with a portion thereof broken away to facilitate illustration of an adjustable roll supporting means;

FIG. 7 is a view in section seen along line 7—7 of FIG. 2;

FIG. 8 is a plan view of the apparatus shown in FIG. 7;

FIG. 9 is a view seen along line 9—9 of FIG. 7;

FIG. 10 is a view seen along line 10—10 of FIG. 9;

Figure 4:
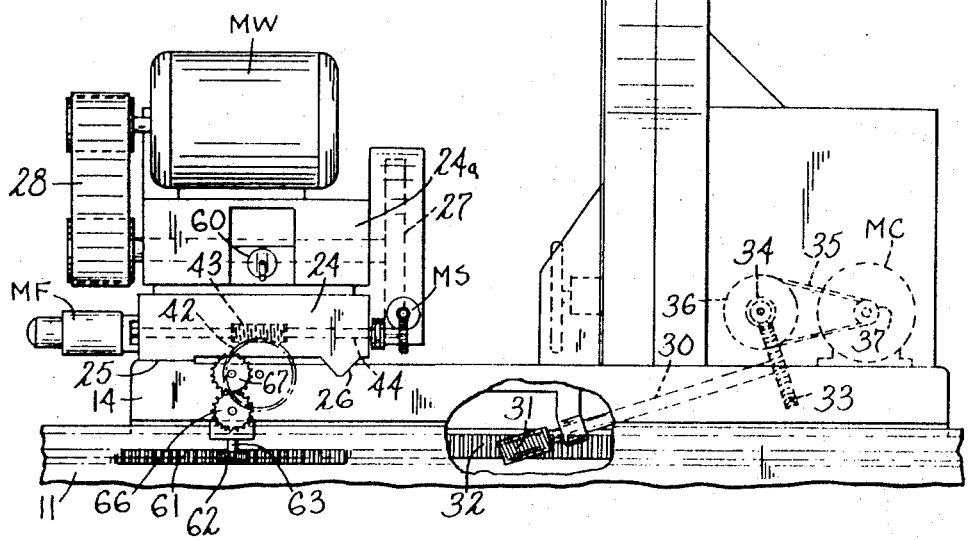
FIG. 4 is an enlarged rear elevation of a portion of the apparatus of FIG. 1, with a portion broken away to show a means for moving the grinding head along the length of a roll to be ground.
Figure 5:
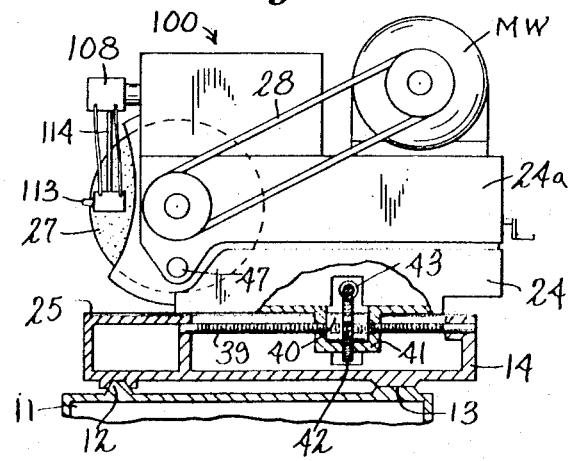
FIG. 5 is a view, partly in section, seen along line 5—5 of FIG. 2.

FIGS. 11, 12, 13, and 14 are views of a roll which diagrammatically illustrate a method of alignment of a roll in accordance with the invention;

FIG. 15 is an elevation of the grinding head of the machine of FIGS. 1-2, partly broken away, to show a probe assembly for detecting the relative positions of the grinding wheel and a roll.

FIG. 16 is a schematic diagram of a hydraulic circuit showing a means for actuating the probe assembly of FIG. 15;

FIG. 17 is a diagram, partly schematic and partly in block, representing a probe unit which emits a signal proportional to displacement of a probe member;

FIG. 18 is a schematic diagram of the various motors utilized in the grinding apparatus disclosed in FIGS. 1-6; and FIGS. 19a, 19b and 19c are schematic diagrams of control and logic circuits utilized automatically in aligning a roll.

The overall arrangement of grinding apparatus embodying the features of the invention, and upon which the invention may be practiced, is generally illustrated in FIGS. 1-6. Grinding apparatus generally indicated by the referenced numeral 10 comprises a bed or frame member 11 having parallel ways 12 and 13 provided thereon. A carriage 14 is movable along the length of ways 12 and 13. A mill roll R, indicated in broken line, may have its journals or necks 16 supported by neck rests 17 and 18. Neck rests 17 and 18 are longitudinally positionable on ways 19 and 20, FIG. 3, parallel to ways 12 and 13.

Roll R is initially mounted on neck rests 17 and 18 and between headstock 21 and footstock 22, respectively. The mill roll is chucked to the headstock by suitable dogs or driving clamps (not shown) and is rotatably driven by headstock motor MH through suitable reduction means indicated by the reference numeral 23. As hereinafter more fully described, neck rest 18 includes adjusting means adapted to move a roll neck supported thereon transversely of ways 19 and 20. Mounted on carriage 14 is a sub-carriage 24 movable on ways 25 and 26 (FIG. 4) perpendicular to ways 12 and 13. Sub-base 24 includes a grinding head 24a carrying thereon a grinding wheel 27. Grinding wheel 27 is driven by grinding wheel motor MW through endless belt 28.

Carriage 14 is driven along ways 12 and 13 by motor MC, FIG. 4. A drive shaft 30 is rotatably supported on carriage 14 and carries at one end thereof a worm gear 31 which drivingly engages a rack 32 extending along bed 11. The other end of drive shaft 30 a worm wheel 33 thereon drivably engaged by a worm gear 34. Worm gear 34 is driven from motor MC through belt 35 about pulleys 36 and 37. Carriage 14 is driven in either direction along ways 12 and 13 by motor MC, which may be reversibly operated.

Sub-carriage 24 is movable on ways 25 and 26 defined on carriage 14 transversely to ways 12 and 13. Sub-carriage 24 is driven by a lead screw 39 (FIG. 5) rotatably mounted within carriage 14. A traveling nut 40 is carried in housing portion 41 of sub-carriage 24. A gear 42 is secured to nut 40 and is driven by a worm 43 on a shaft 44. (FIG. 4). Shaft 44 is driven by either a fast infeed motor MF or a slow infeed motor MS. In practice, sub-carriage 24 is advanced towards a mill roll R at a first fast infeed speed until it is a predetermined distance from the roll and then it is advanced at a second or slow infeed speed until it is almost in contact with the roll at which time the grinding wheel is tilted toward the roll.

When either motor MF or MS drives shaft 44, worm 43 thereon drives gear 42, which turns nut 41, which in turn produces movement of sub-carriage 24 along ways 25 and 26. It will, of course, be understood that movement of sub-carriage 24 along ways 25 and 26 is reversible. For extremely precise control of grinding wheel infeed, the grinding head 24a is pivotal about pin 47 carried in sub-carriage 24.

A mechanism for tilting grinding head 24a, and hence moving grinding wheel 27 into contact with roll R, is disclosed in Patent 3,088,250, and is incorporated herein by reference.

As thus far described, the grinding machine 10 is arranged to have grinding wheel 27 move along the length of a roll R, and move toward and away from the roll. Means are also provided to move the grinding wheel along a predetermined path corresponding to a given crown for a roll. This arrangement allows a roll to be ground with a predetermined concave or convex contour along the length thereof.

Tilting movement of grinding head 24a about pin 47 is accomplished through rotation of lead screw 48. Lead screw 48 is driven in a manner hereinafter described. When lead screw 48 is rotated, dependent upon the direction of rotation, nut 51 will move thereon. When nut 51 runs up lead screw 48 it raises a lever 52 and causes it to pivot in a clockwise direction as viewed in FIG. 7 about knife edge 53. This produces a similar motion of pin 54 and rotates lever 55 about its support on a carrier 56. Lever 55 then exerts an upwardly directed force on knife edge 57. Knife edge 57 reacts against grinding wheel head 24a while knife edge 53 reacts against upstanding portion 58 from sub-base 24. As lever 55 rotates in a clockwise direction it will tilt head 24a about pin 47 and move grinding wheel 27 toward a roll. From the foregoing, it will be apparent that as nut 51 runs down lead screw 48, reverse action to that described will take place.

In some cases it may be desired to grind a crown, either convex or concave onto the roll. Lever 55 may be operated automatically by offsetting an eccentrically adjustable circular ring or cam 60. The degree of crown is selected by the operator.

The position of a circular cam 60 is selected in accordance with the desired crown. A follower 61 rides on the periphery of cam 60 and supports thereon lever 55 on lever carrier 56. Thus, as cam 60 is rotated, follower 61 may move upwardly and downwardly and operate lever 55 and grinding head 24a.

Cam 60 is arranged to be operated by movement of carriage 14 along bed 11 by a gear train, generally indicated by the reference numeral 60a. A rack 61 is defined along bed 11. A gear 62 on a shaft 63, rotatably carried by carriage 14, is driven by rack 61 as carriage 14 moves along bed 11. Shaft 63, through bevel gears 64 and 65, drives gear 66, which in turn drives gear 67 on shaft 68. Shaft 68, through bevel gears 69 and 70, drives shaft 71 and worm 72 thereon. Worm 72 drives a gear 73 and shaft 74, which rotates cam 60.

Cam 60 is initially offset about its rotative axis by means of bevel gears 75 and 75a (FIG. 10). When bevel gear 75a is rotated it drives bevel gear 75. Bevel gear 75 drives a cam offsetting screw shaft 76, which adjusts the position of cam 60 with respect to shaft 74.

Thus, the degree of offset of the geometric center of cam 60 with respect to the axis of shaft 74 determines the crown that will be ground onto a roll. It is apparent that if the axis of shaft 74 coincides with the geometric center of cam 60, the above-described crowning mechanism is ineffective.

The operator may set the degree of curvature by manipulating shaft 77 and bevel gear 75a to adjust the center of cam 60 with respect to shaft 74. Alternatively, bevel gear 75a may be operated by power means (not shown) from a remote station as disclosed in U.S. Patent 3,088,-250. A crown adjustment, as herein illustrated, is more fully disclosed and claimed in U.S. Patent 2,814,914.

Grinding wheel 27 may be tilted into roll R by means of a handwheel 78 on the lead screw shaft, or lead screw 48 may be driven by motor MT. Motor MT drives a pulley 79 which in turn drives a slow tilt infeed clutch 80 and a fast tilt infeed clutch 81. Clutches 80 and 81 are electromagnetically actuated, and either through belts 82 and 83, respectively, may drive lead screw 48, as shown in FIG. 8.

Neck rest 18 at the footstock end of the machine is arranged to move the neck 16 supported thereon toward and away from grinding wheel 27, and hence move the roll about its center point of support on neck rest 17. Neck rest 18 (FIG. 6) comprises a base portion 84 and a movable arm portion 85 pivoted to base portion 84 at 86. Carried in base portion 84 is a roll neck bearing block 87, and carried in arm portion 85 is a roll neck bearing block 88. Arm portion 85 is pivotally movable with respect to base portion 84 through levers 89 and 90, actuated by lead screw 91 which has a traveling nut 92 thereon. Lead screw 91 has at one end thereof a gear 93 drivingly engaged by a pinion 94 on the shaft of neck rest motor MN. When motor MN is operated pinion 94 drives gear 93 which in turn rotates lead screw 91, and traveling nut 92 moves up or down on lead screw 91. Lever 90 is moved up or down with traveling nut 92 and rotates an eccentric shaft 95 to which it is keyed. Rotation of eccentric shaft 95 then moves levers 89 (only one shown) upwardly or downwardly and in so doing moves arm 85 with bearing block 88 therein toward or away from grinding wheel 27.

When a roll is initially placed on neck rests 17 and 18, the axes thereof, due to uneven wear of the roll journals 16, will not be aligned in parallelism with the path of travel of carriage 14 on ways 12 and 13. Before the roll can be accurately ground to a predetermined uniform dimension throughout its length, if its contour is to be cylindrical, or ground with a predetermined crown thereon, the axis of the roll must be aligned with the line of travel of the grinding wheel along ways 12 and 13.

The present invention provides means for aligning a roll with the ways 12 and 13. In some cases the roll, due to inaccurate previous grinding, may have a taper thereon; that is, the diameter at one end of the roll face may be greater than the diameter at the other end of the roll face. In cases such as this, the roll must be initially positioned such that the machine or operator thereof may recognize the roll geometry and detect the misalignment of the axes of the roll having a taper along the face thereof.

In accordance with the invention, a roll which is initially placed in the grinding machine is operated upon in such manner as to align one surface thereof or one side thereof with ways 12 and 13. In the case of a roll having a contour or outline, or a symmetrical crown thereon, aligning one side of the roll with ways 12 and 13 will result in proper alignment of the axis of the roll. However, if the roll has a taper along the face thereof, alignment of one side of the roll with the ways 12 and 13 will not properly align the roll axis. However, the tapered roll will be in such a position that its geometry may then be recognized and further means may then be utilized to move the roll into a position in which the axis is aligned parallel to ways 12 and 13.

FIGS. 11–14 diagrammatically illustrate how a roll may be aligned with one side thereof parallel to the path of grinding wheel 27 and ways 12 and 13. A worn roll, as illustrated in FIGS. 11–14, will have experienced greater wear at the central portions thereof than in the portions towards the ends of the face thereof. The area or portion of greater wear depends on the width of strip the roll was operating upon. This portion of greater wear is indicated in FIGS. 11–14 by the reference letter W. FIG. 11 illustrates a roll R1 placed on neck rests 17 and 18 with its axis A misaligned with respect to ways 12 and 13, as represented by the path of travel T of grinding wheel 27.

In accordance with the invention, grinding wheel 27 is advanced toward the headstock end of roll R1 at point or position HS until a predetermined pressure is created between grinding wheel 27 and roll R1. Alternately, the wheel is advanced to the roll until a first predetermined pressure is created, then traversed toward point WA, and further advanced until a second predetermined pressure is established. This predetermined pressure is conveniently measured by the load current of grinding wheel motor MW which is a measure of the torque on grinding wheel 27. When this second predetermined pressure is reached, it determines a gaging position of wheel 27 and thereafter grinding wheel 27 is traversed the length of the face of roll R1 towards the footstock end, to position FS as indicated by path T. Path or line T is a gaging line established by the grinding wheel. As grinding wheel 27 traverses towards the footstock end of the roll face, position FS, the pressure between the grinding wheel and roll may increase or decrease depending upon the direction of misalignment of the axis of roll R1. If the contact pressure as measured by the current of motor MW increases, motor MN is operated to move the journal on neck rest 18 in the direction of arrow B until the pressure falls to the predetermined value. As shown by the orientation of roll R1 in FIG. 11, the pressure between grinding wheel 27 and roll R1 would decrease as grinding wheel 27 is traversed along line T to point WA, unless a high spot on the roll was encountered by the grinding wheel. Point WA is located to the footstock side of the mid-point of roll R1 and is so selected that it is positioned beyond the region of greatest expected roll wear. Now as grinding wheel 27 reaches point WA, neck rest motor MN is operated to move roll R1 toward or away from grinding wheel 27, as represented by arrows C, FIG. 12, in such manner as to regulate the pressure between grinding wheel 27 and roll R1 at the predetermined value. For example, assume that the predetermined value is represented by a motor MW load current of fifty amperes. If the load current falls below fifty amperes, neck rest motor MN is operated to move roll R1 towards grinding wheel 27 until the load current just exceeds fifty amperes. Thereafter, motor MN is operated to move roll R1 away from grinding wheel until the current falls below fifty amperes. In this manner the position of the roll is regulated to a position such that there is a predetermined pressure between grinding wheel 27 and the roll. Otherwise stated, roll R1 is moved by neck rest motor MN to align one side thereof with gaging line T established by the path of grinding wheel 27. Motor MN in response to sensing of the load current of motor MW is operated to move neck rest 18, as necessary, to properly position roll R1 while grinding wheel 27 is between the points WA and FS.

When grinding wheel 27 traverses to point FS, the direction of traverse of grinding wheel 27 may be reversed back towards point WA, FIG. 13. At this time, the roll may be subjected to several different treatments in accordance with the invention. Dependent upon the distance between points WA and FS, one side of the roll may be aligned with path T within a desired accuracy. However, in some instances, the distance between points WA and FS may not be sufficient for one side of the roll to be aligned with line T. The roll may be continuously regulated in position as grinding wheel 27 travels toward point WA in the same manner as described when the grinding wheel was moving toward points FS from WA, as represented by arrows D. When point WA is reached, the neck rest motor MN is no longer operated and the grinding wheel follows path T back to point HS. However, this may impart a slight taper to the roll. Alternatively, the grinding wheel may be retracted from the roll as shown in FIG. 13 at point WA and traversed to point HS.

However, in the preferred form, operation of neck rest motor MN is halted when the pressure between the wheel 27 and the roll is sensed to be at the predetermined value as the wheel moves from point FS to point WA. With the wheel moving toward point WA, (FIG. 13) if the neck rest 18 is moving the roll away from the wheel, as soon as the current of motor MW falls below fifty amperes, operation of motor MN is halted to prevent further movement of the roll. Similarly, if neck rest 18 is moving the roll toward the wheel, as soon as the current of motor MW exceeds fifty amperes, operation of neck rest motor MN is halted. Then when the wheel reaches point WA, it is retracted, and traversed to point HS along path T1 as shown in FIG. 14.

During this last-mentioned operation, motor MN is not operated and the roll remains stationary.

From the foregoing description it will be noted that the grinding wheel is fed into the roll until a predetermined pressure is established. This, in turn, establishes a gaging position, or line of travel of grinding wheel 27, represented by the line T. Thereafter, the roll R1 is moved to align one side thereof with the line T, which is parallel to ways 12 and 13. The foregoing procedure, in effect, rotates roll R1 about the center point of support on neck rest 17, indicated by the reference letter E.

The foregoing procedure may be repeated if desired for greater accuracy in alignment. If the roll being operated upon has a cylindrical contour or is formed with a symmetrical crown thereon, the foregoing procedure will align the axis of the roll with ways 12 and 13. If the roll has a crown thereon, the crown mechanism previously described is utilized to impart the desired curvilinear path to grinding wheel 27. Assuming that the roll R1 has a crown thereon, the crowning mechanism disclosed in FIGS. 7, 9 and 10, is rendered operative to superimpose the desired degree of crown corresponding to that on roll R1, or line of travel T. When the crowning mechanism is thus operated it imparts to grinding wheel 27 a degree of movement corresponding to the crown on the roll so that the path T of the grinding wheel will be slightly convex or concave to a predetermined degree. In this manner, a roll with a crown thereon may be aligned in the same manner as a cylindrical roll.

It will be understood that the foregoing alignment procedure may be under control of an operator who would observe the load current to motor MW on a suitable current indicating meter M (FIG. 18) and operate motor MN in response to the value of the observed load current of motor MW.

Alternatively, and in accordance with the invention new and improved means are provided to automatically affect the above-described alignment procedure, as will hereinafter be described.

In advancing, the wheel to the roll at point HS, means are provided to sense the relative position of the roll and grinding wheel. Such means, as shown in FIG. 15 comprise a probe member adapted to contact the roll and emit a signal indicative of the distance between the roll and the grinding wheel.

A roll contacting probe unit is generally indicated by the reference numeral 100 and comprises a carrier member 101 movable on guide rods 102 (only one shown) on grinding head 24a. Carrier member 101 is positioned by means of a lead screw 103 in accordance with the initial diameter and subsequent wear on grinding wheel 27. The carrier member positioning apparatus and a grinding wheel dresser assembly is generally indicated by the reference numeral 104. This positioning apparatus and dresser assembly is disclosed and claimed in aforementioned U.S. Patent 3,088,250, and is not described in detail herein. Suffice it to say that carrier member 101 is positioned by a lead screw in accordance with the diameter and wear of grinding wheel 27. Carrier member has mounted thereon a hydraulic cylinder 105 operated by a two position, four-way hydraulic valve 106, as more clearly illustrated in FIG. 16. Briefly valve 106 is operated by a solenoid WPS to either advance or retract the piston 107 of cylinder 105. Operated by piston 107 is a probe assembly which comprises a linear variable differential transformer (LVDT) 109 carried in housing member 108. Housing member 108 is guidably movable in upright portions 110 by piston 107 between an extended and a retracted position. Supported from housing member 108 on cantilever springs 111 is a probe unit 112 having a roll engaging tip 113. When unit 112 is deflected as member 108 is extended toward the roll, link or rod 114 moves the plunger 115 of LVDT 109, a distance proportional to such deflection.

As is well known to those skilled in the art, a linear variable differential transformer comprises a primary winding and a pair of serially opposed secondary windings, as schematically illustrated in FIG. 17. The primary winding is excited from an alternating current source 116 and the position of a movable magnetic core 117 determines the phase and magnitude of the voltage induced in the secondary windings. When the movable core 117 is in a neutral position the voltages induced in the secondary windings will be equal and opposite. However, if the core should be moved the net voltage induced in the secondary windings will be proportional to the magnitude of displacement of the core from its mid-point or neutral position and the phase of the secondary windings will be indicative of the direction of displacement. The magnitude of the displacement and the direction thereof is effected through use of a discriminator or demodulator 118 which compares the voltage applied to the primary winding and the phase thereof with the net voltage of the secondary windings and the phase thereof. The result of such comparison is then rectified to give a uni-directional signal indicative in magnitude and polarity of the displacement of core 117. As will hereinafter be described, this uni-directional voltage of the output of the discriminator is utilized to represent the position of the grinding wheel with respect to the roll by energizing selected relays WPA and WPB at predetermined voltage levels of the discriminator output voltage. As exemplified in FIG. 17 the core 117 is biased to an extended position by spring 119 and, therefore, the voltage output of the discriminator will be a maximum. However, as the core is moved towards its mid-point or neutral position the voltage output of the discriminator will decrease linearly with displacement.

The power circuits for the headstock motor MH, grinding wheel motor MW, carriage drive motor MC, tilt infeed motor MT, neck rest motor MN, the sub-carriage fast feed motor MF and slow feed motor MS are schematically shown in FIG. 18. FIGS. 19a, 19b, and 19c illustrate schematically the control circuitry for the motors of FIG. 18 and the logic for the function of aligning one side of a roll with respect to the path of travel of the grinding wheel.

Referring first to FIG. 18, each of the motors has in circuit therewith line contactors and reversing contactors, where appropriate, which are actuated by relays as hereinafter described in conjunction with FIGS. 19a–19c. In circuit with the grinding wheel motor MW is a current measuring reactor CMR. Current measuring reactor CMR is of a type well known in the art, and need not be here explained in detail. Briefly, the motor load current will aject the saturation of a magnetic core which in turn will control the current through windings thereon in proportion to the saturating motor current. Relays LHR, LSR and LOR sense predetermined values of grinding wheel load current as a measure of wheel pressure on the roll.

Relay LHR is energized when the load current of grinding wheel motor MW exceeds a predetermined value by a small amount. For example, the predetermined current value corresponding to a selected wheel pressure may be fifty amperes. Then relay LHR may be selected to be energized when the load current reaches 50.1 amperes. Correspondingly, relay LSR would be selected to be de-energized at 49.9 amperes. The current values are exemplary only. Relay LOR (FIG. 18) is energized when the load current of motor MW is at some predetermined value less than fifty amperes, for example, twenty amperes. The position of carriage 14 along the length of the roll at positions HS, FS and WA (FIG. 11) is indicated by trip switches TSH, TSF and TSPF, respectively (FIG. 19a). Switch TSH is closed when the grinding wheel is at the right of position HS as viewed in FIG. 11, and remains closed except when the grinding wheel is moved further toward the headstock. Switch TSF is closed when the grinding wheel is to the left of point FS, as viewed in FIG. 11. Switch TSPF is closed except when the grinding wheel is to the right of point WA, FIG. 11. In this manner, the trip switches TSH, TSF and TSPF indicate the position of the grinding wheel relative to the roll and points HS, WA, and FS.

In FIGS. 18 and 19a–19c, relay coils and their corresponding controlled contacts are identified by the same reference letters. In FIGS. 19a–19c, the control bus lines are indicated as B1, B2 and B3, and the lines therebetween are indicated by the letter L followed by numerals.

Control power voltage is applied across lines B1 and B2 by a step-down transformer TRX having its secondary in line L1. Voltage is applied to the primary from two of mains M, FIG. 18.

Headstock motor MH is operated by closing start switch SMH which energizes relay MHR which picks up its contacts in the lines to motor MH. Motor MH may be stopped by opening stop switch SMHS in line L2 to de-energize relay MHR. Grinding wheel motor MW is started by depressing start switch SMW to energize relay MWR, line L3, which picks up its contacts in the lines to motor MW. Motor MW may be stopped by opening stop switch SMWS in line L3 to de-energize relay MWR.

In the following description the circuits shown in FIGS. 19a, 19b and 19c should be considered together.

With the carriage at the headstock end of the roll face, point HS, the alignment function is initiated by closing switch X, line L17, which energizes relay BXR and enables initiation of the alignment function. Contact BXR in line L18 is picked up, thereby energizing control bus line B3 and also energizes relay WAH which picks up its contact in line L19 to energize relay BJR and initiate approach of the grinding wheel towards the roll.

With the grinding wheel at the headstock end of the roll face, point HS, trip switch TSH is open (line L7) and relay CAH is de-energized. The carriage is at rest and relays MCTL and MCTR (lines L25 and L26) which control operation of carriage drive motor MC are de-energized. Also, at this time wheel probe relay WPE, line L24, is de-energized and the wheel probe (FIG. 15) is retracted.

Prior to the grinding wheel approaching the roll, there is no load on the grinding wheel and relay LLR, line L12, which is energized when the motor current is at a predetermined light load is de-energized.

With the grinding wheel at the headstock end of the roll face (point HS) trip switch TSPF is closed, relay CAW is energized, and picks up its contact in line L24 to energize wheel approach relay WPE. When wheel approach relay WPE is energized it, in turn, picks up its contacts in line L4 and energizes solenoid WPS (FIGS. 16 and 19a) to extend the probe towards the roll.

As the wheel probe advances towards the roll, contacts the roll and is deflected, the LVDT actuated thereby, together with its discriminator circuitry (FIG. 17), emits a voltage which linearly decreases with deflection, and as this voltage decreases to predetermined voltage values, relays WPA and WPB (FIG. 17) are sequentially energized and close their respective contacts in lines L15 and L16 to energize relays WPCL and WPFL.

With reference to line L21, as the wheel probe advances limit switch LSPWA (see also FIG. 15) is closed and since contacts BJR, CAW and WPCL in line L21 are closed, relay MSH is energized, picking up its contacts to energize fast subcarriage infeed motor MF and drive the sub-carriage 24 towards the roll. When the wheel probe is deflected to the point where the voltage output of the LVDT discriminator is a lower value, relay WPA (FIG. 17) is de-energized, opening its contact in line L15, thus de-energizing relay WPCL which drops out its contact in line L21 and de-energizes relay MSH. This deenergizes motor MF. At the same time, relay MSL, line L22, is energized and picks up its contacts to energize slow sub-carriage infeed motor ML. When the wheel probe LVDT has been deflected to an extent where the voltage output from the discriminator circuitry thereof goes below a second predetermined value, relay WPB (FIG. 17) is de-energized and its contact in line L16 is opened. This de-energized relay WPFL which opens its contact in line L22. This, in turn, de-energizes relay MSL, line L22. The sub-base 24 has now been advanced and further approach of ginding wheel 27 onto the roll is accomplished by titling base 24a toward the roll. When relay WPFL is de-energized its contact in line L23 is closed and relay TCLH, line L23, is energized, which enables the grinding wheel to be tilted toward the roll.

When relay TCLH is energized, its contact in line L27 closes and energizes relay THCR. When relay THCR is energized, it picks up its contact in line L54 to energize timing relay TR1. This, in turn, picks up its contact in line L56 and energizes timing relay TR2. When timing relay TR2 times out it closes its contact in line L30 which energizes relay THC in line L29 which latches itself in. The time delay is provided to prevent simultaneous sub-base movement and tilt infeed. Relay THC picks up its contacts in the clutch circuit CLT (FIG. 19a) and energizes the coil CLT1 of the fast tilt infeed clutch 80 (FIG. 8). The grinding wheel is now enabled to be tilted into the rool.

When relay THC is energized it picks up its contact in line L35 and energizes tilt infeed relay MTIF in line L34 which closes its contacts in line with motor MT and tilts the grinding wheel into the roll. Limit switch LSTF in line L34 is opened when the wheel is tilted to its forward limit. Similarly, limit switch LSTR is opened when the wheel is retracted to its retract limit. When the grinding wheel motor MW picks up a predetermined light load, say twenty amperes, relay LOR (FIG. 18) is energized to pick up its contact in line L12. This energizes relay LLR, line L12 which drops out its contact LLR1 in line L24 and de-energizes the wheel probe relay WPE. This de-energized solenoid WPS (FIG. 16) and the wheel probe is retracted by cylinder 105 as previously explained. Relay WPB is energized as the wheel probe retracts, and closes its contact in line L16 to de-energize relay WPFL which in turn opens its contact in line L34 to de-energize relay MTIF and interrupt tilt infeed of the grinding wheel.

The carriage 14 is now ready to be traversed along the length of the roll. At this time the grinding wheel is still at the headstock end of the roll, trip switch TSH is open, relay CAH is de-energized and relay LLR is now energized. This energizes relay ASAS in line L37 which is latched by its own contact. Relay ASAS when energized signifies that the roll alignment process may begin. Relay CGO in line L38 is then energized through an ASAS contact and, in turn, closes its contact CGO in line L25, which energizes relay MCTL. Relay MCTL when energized permits travel of carriage 14 toward the footstock. Relay MCTL picks up its contacts MCTL and energizes the carriage drive motor MC to start the carriage traversing from point HS toward point FS (FIGS. 19a and 19b). At this time the grinding wheel has not advanced to its gaging position, line T, FIG. 11. The grinding machines does not recognize the direction of misalignment of roll R1. If the direction of misalignment was opposite to that shown in FIGS. 11–14, the wheel in commencing its traverse in the gaging position might take too large a "bite" into the roll before the roll could be moved away. Therefore, the wheel traverse is initiated at a light pressure and if the roll is misaligned toward the wheel, this condition will be recognized by an immediate increase in the current of motor MW.

When relay ASAS is energized it picks up its contact in line L28 and energizes relay TLCR which energizes timing relay TR1. After a short delay timing relay TR1 picks up its contact in line L56 to energize TR2 which picks up its contact in line L30 which energizes relay TLC, line L31. Relay TLC when energized picks up its contacts in circuit CLT (FIG. 19a) to energize the coil of slow speed tilt-infeed clutch 81. At the same time contact TLC in line L29 drops out to de-energize relay THC which opens its contacts in circuit with clutch coil CLT1 and de-enrgizes fast tilt infeed clutch 80.

The grinding wheel is now enabled to be tilted further into the roll as carriage 14 commences to traverse toward the footstock. At this time relays CGO and MCTL are energized, and relay TICR, line L33 is energized. Relay TICR enables forward tilt infeed of grinding wheel 27. Relay TICR picks up its contact in line L35 to energize relay MTIF in line L34. Relay MTIF then picks up its contacts in the line to motor MT, FIG. 15, and the grinding wheel is tilted further into the roll. When the current to motor MW exceeds fifty amperes, relay LHR is energized, picking up its contacts in line L10, and energizing relay LGT. Also, the contact of relay LSR in line L11 is opened de-energizing relay LLT. This allows relay ATR, line L39 to be energized and latched through its contact in line L40. Energizing relay ATR halts further infeed of the grinding wheel after a predetermined time interval. The ATR contact in line L55 energizes timing relay TR3, which picks up its contact in line L57 and energizes timing relay TR2, line L56. When timing relay TR2 times out it opens its contact in line L33, relay TICR opens its contact in line L35 to de-energize relay MTIF and halt motor MT. Simultaneously, TR2 contact in line L40 is closed to energize relay TSTP, which latches itself in and also opens its contact in line L33 to disable relay TICR and also tilt infeed relay MTIF in line L34.

At this point, infeed of the grinding wheel ceases, and the grinding wheel is in a gaging position moving along the path T, FIGS. 11 and 12. Also, relay TSTP, by picking up its contact in line L42, enables operation of neck rest motor to back the roll off from the grinding wheel.

If now, the grinding wheel motor current exceeds fifty amperes, relay LHR senses such condition and picks up its contact in line L10 to energize relay LGT, which picks up its contact in line L42, and energizes neck rest motor relay MNRR. Relay MNRR picks up its contacts in line with motor MN which then moves the roll away from the grinding wheel.

When the grinding wheel motor load current falls to less than fifty amperes, relay LHR is de-energized dropping out its contacts in line L10 and de-energizing relay LGT. However, relay LSR is energized and closes its contact to energize relay LLT, line L11. Relay LLT then opens its contact in line L42, de-energizing relay MNRR and, hence, neck rest motor MN.

At this time the roll will remain in its position unless the grinding wheel motor current again exceeds fifty amperes, as may happen if a high spot on the roll is encountered. This may happen any number of times until the footstock wheel approach point WA is reached by the grinding wheel. At no time does the roll move toward the grinding wheel until the grinding wheel reaches point WA, past the region W of greatest wear.

However, assuming that the motor load current does not again exceed fifty amperes, the grinding wheel will traverse along the length of the roll on path T, FIGS. 11 and 12, without further infeed. It will be understood that the grinding wheel will wear somewhat due to grinding and there may be some infeed of the wheel to compensate for this wear. In practice, the grinding wheel may be programmed in accordance with the speed of traverse, type of wheel, type of roll being ground, etc., which determines the rate of continuous infeed to compensate for wheel wear.

When the grinding wheel reaches the footstock wheel approach point indicated by the broken line WA, FIG. 12, trip switch TSPF, line L9 is opened to de-energize relay CAW. This condition states that the grinding wheel has traversed to the footstock wheel approach WA and the pressure between the grinding wheel and the roll is such that the load current drawn by the grinding wheel motor is less than fifty amperes. When relay CAW is energized under these conditions, relay MNRF, line L50, is energized and picks up its contacts MNRF to energize neck rest motor MN and move the neck rest and the roll thereon toward the wheel until the grinding wheel motor load current is greater than fifty amperes. This is sensed by relays LHR and LSR as previously described. Neck rest motor MN will then be energized as necessary to move the roll in and out regulating the position of the roll such that the measure between the grinding wheel and roll is regulated at fifty amperes, until the grinding wheel reaches the point FS, FIG. 12, at which time trip switch TSF is opened to de-energize relay CAF, line L8. Contact CAF, line L25, is dropped out to de-energize relay MCTL, and interrupt power to carriage motor MC. At this time trip switch TSH is closed and relay CAH is energized, picking up its contact in line L26 to energize relay MCTR and de-energize relay MCTL. Relay MCTR picks up its contacts MCTR in the line to carriage drive motor MC. Motor MC is now energized to drive the carriage from the footstock to the headstock.

With the grinding wheel carriage moving toward the headstock from the footstock (relay MCTR, line L26, energized) and the neck rest moving the roll away from the grinding wheel (relay MNRF, line L42 is energized), as soon as the load current falls below fifty amperes relay LLT, line L11 is energized, which energizes relay ABNA in line L43. Relay ABNA is then latched in by its contact in line L44, to prevent further movement of the neck rest in either direction. At this time neck rest motor controlling relays MNRR and MNRF are both locked out by open ABNA contacts in line L42 and line L50.

Alternately, if the carriage is moving toward the headstock, and the neck rest is moving the roll towards the wheel (relays MCTR and MNRF energized) as soon as the grinding wheel motor load current exceeds fifty amperes relay LSR drops out its contact LSR in line L11 and de-energizes relay LLT, relay ABNT, line L45 is then energized and picks up its contact in line L46 to latch itself in and prevent further movement of the neck rest in either direction, since neck rest controlling relays MNRR and MNRF are both locked out by the open ABNT contacts in lines L42 and L50, respectively.

In either situation, as the carriage moves past the grinding wheel footstock approach point, trip switch TSPF, line L9 is opened and relay CAW is de-energized.

When the grinding wheel is moving toward the headstock, between the point FS and the point HS, trip switch TSF is closed and relay CAF is energized. This causes relay AAFS, line L49, to be energized through the CAF contact in line L47. When relay AAFS is energized it picks up its contact in line L48 and latches itself in. This indicates the grinding wheel is traversing toward the headstock.

When the carriage is moving toward the headstock, as it crosses the footstock wheel approach point MA, trip switch TSPF is closed, relay CAW is energized and picks up its contact in line L48 and energizes relay ARSP, line L48. Relay ARSP when energized locks out neck rest control relay MNRR and MNRF. When relay ARSP is energized it drops out its contact in line L40 and this de-energizes relays TSTP, line L40, relay ATR, line L39, relay ABNA, line L43 and relay ABNT, line L45. This normally prevents any further movement of the movable neck rest and the grinding wheel would then traverse along the length of the roll face back to the headstock.

The carriage then continues to traverse to the headstock, when it reaches the headstock, limit switch LSH is opened and relay CAH de-energized. When relay CAH is energized, it picks up its contact in line L46 and energizes relay AROP, line L47. Relay AROP when energized will initiate a second pass of the grinding wheel along the length of the roll face from point HS to point FS.

During the second sequence, as the carriage moves towards the right as viewed in FIGS. 11 and 12, the operation is as follows:

If the current is greater than fifty amperes the neck rest will move one roll away from the wheel until the current falls below fifty amperes. If this current again becomes greater than fifty amperes the neck rest will again run the roll away from the grinding wheel. This may happen any number of times until the grinding wheel reaches the footstock wheel approach point.

At this point the neck rest will run the roll in if the wheel current is less than fifty amperes. However, if the load current is greater than fifty amperes, the neck rest will move the roll away from the wheel. Here again it should be noted that the neck rest motor may be continuously moving the roll in and out until the footstock is reached to regulate the position of the roll with respect to path T. When this occurs, relay ASTP in line L53, is energized and latched in. When energized relay ASTP also opens its normally closed contact in line L38 to de-energize relay CGO. When relay CGO is de-energized it opens its contact in line L25 and locks out the carriage motor relay MCRF and MCRR to prevent further movement of the carriage. The alignment function is now complete.

At this time one surface of the roll has been aligned essentially parallel to the path of travel of the grinding wheel along the length of the roll face. This alignment has been accomplished by utilizing the grinding wheel itself as a gaging element while moving one end of the roll about its central point of support on the stationary neck rest.

Normally, on the return traverse of the alignment function, the motor load current will not exceed fifty amperes. However, in some cases the grinding wheel may encounter a load current of greater than fifty amperes when it is between the footstock wheel approach point and the headstock. In such cases this increase in load current may be ignored.

Alternately, the grinding wheel may be retracted at point WA and returned to point HS, as exemplified in FIGS. 13 and 14. When the carriage is to the headstock side of the foostock wheel approach point trip switch TSPF is closed, relay CAW in line L9 is energized and its contact in line L52 is closed to energize relay AIAR. When relay AIAR is energized it picks up its contact in line L36 and energizes relay MTIR which picks up its contacts in the tilt infeed motor circuit to energize motor MT and withdraw the wheel from the roll as shown in FIG. 13. Another AIAR contact in line L58 closes and energizes timer TR4. When timer TR4 times out, it closes its contact in line L51 to energize relay ARC. When relay ARC is energized, it de-energizes relay AIAR by opening its normally closed contact in line L51. When relay AIAR is de-energized, it drops out its contact in line L36 to de-energize relay MTIR which opens the circuit to motor MT and the wheel is no further retracted. Thereafter the grinding wheel returns to its headstock to be in a position to repeat the alignment sequencing described above.

The purpose of relays and contacts not discussed at length will be apparent from the foregoing description and FIGS. 19a–19c taken with FIG. 18. Relay LRRY serves a permissive function in that it must be energized for a set time before relay LLR can be energized to halt tilt infeed as the grinding wheel initially approaches the roll at HS.

At the completion of the alignment function, one surface or side of the roll is within a desired degree of parallelism with the direction of travel of the grinding wheel as seen in FIG. 14 and the ways of the grinding wheel carriage. The roll is now in a position with its axis parallel to ways 12 and 13, or, alternatively, in a position with one surface thereof parallel to ways 12 and 13, which can be recognized by the machine and the degree of misalignment of the axis of the roll with the ways may be detected. The axis of the roll is then brought into alignment with the ways of the machine through utilization of the neck rest motor MN. This may be accomplished as disclosed in the co-pending application of Alfred T. Parrella and Gene R. Gagliardi, Ser. No. 411,774 filed Nov. 17, 1964, and assigned to the same assignee as this application.

Assuming that the roll face was of cylindrical outline or had a symmetrical crown thereon, one side of the roll and hence the axis thereof is now aligned within a desired degree of parallelism with ways 12 and 13, or alternatively stated, with path T, FIG. 11. If there is a taper on the roll, further alignment of the roll axis is necessary. However, since the side of the roll adjacent the grinding wheel is aligned with path T, the roll is in a position in which its geometry is easily recognizable and the degree of misalignment detected and corrected. As used herein, the term aligning refers to rolls having initially cylindrical shapes and also those having a symmetrical crown thereon.

This may be accomplished through use of a caliper-like assembly 120, FIG. 3, mounted on carriage 14 which measures the diameter of a roll, as shown in FIG. 3 at points equidistant each end of the roll face. The difference in these dimensions is then utilized to drive neck rest motor MN until the axis of the roll is aligned with the line of travel of carriage 14. The caliper-like assembly 120 is disclosed and claimed in the aforementioned copending application of Alfred T. Parrella and Gene R. Gagliardi.

The trip switches TSH, TSF and TSPH may be physically arranged on the grinding apparatus so as to be actuated in response to the position of the grinding wheel. Additionally they will be adjustable in location in order that they may be positioned in accordance with the dimensions of a given roll. A preferred trip switch positioning arrangement is disclosed in the aforementioned co-pending application of Alfred T. Parrella and Gene R. Gagliardi.

It may thus be seen that the objects of the invention set forth as well as those made apparent from the preceding description are efficiently attained. While a preferred embodiment of the invention has been set forth for purposes of disclosure, other embodiments of the invention as well as modifications to the disclosed embodiments may occur to those skilled in the art which do not depart from the spirit and scope of the invention. It is, therefore, intended in the appended claims to cover all embodiments of the invention, as well as modifications to the disclosed embodiments of the invention which do not depart from the spirit and scope of the invention.

What is claimed is:

1. In a roll grinding machine having means for rotatably supporting a roll having a roll face and a grinding wheel arranged to operate on the roll; means for advancing the grinding wheel onto the roll face at one end thereof, means for sensing the pressure between the wheel and roll and halting advance of the wheel when a predetermined pressure is established, means for transversing the grinding wheel toward the other end of the roll, means for moving said other end of the roll away from the grinding wheel if the pressure therebetween exceeds the predetermined pressure, means for detecting when the grinding wheel has traversed a preselected distance along the length of the roll face, and means responsive to said sensing means for actuating said means for moving to move said other end of the roll toward said grinding wheel until the same predetermined pressure is established.

2. In a roll grinding machine having means for rotatably supporting a roll having a roll face and a grinding wheel arranged to operate on the roll; means for advancing the grinding wheel onto the roll face at one end thereof, until a predetermined pressure between the wheel and roll is established, means for traversing the grinding wheel in a straight line toward the other end of the roll face, means for sensing when the grinding wheel has traversed to a predetermined position at the other end of the roll face, and means responsive to said sensing means for moving the other end of the roll face toward the grinding wheel until the same predetermined pressure is established.

3. The arrangement of claim 2 further including means for actuating said means for moving said other end of the roll to move said other end of the roll away from said grinding wheel if the pressure exceeds said predetermined pressure as said wheel traverses toward the other end of the roll.

4. In a roll grinding machine having means for rotatably supporting a roll having a roll face and a grinding wheel arranged to operate on the roll; means for advancing the grinding wheel onto the roll face at one end thereof until a predetermined pressure between the wheel and roll is established, means for traversing the grinding wheel in a straight line toward the other end of the roll, means for moving said other end of the roll away from the grinding wheel if the pressure therebetween exceeds the predetermined pressure, and means for sensing when the grinding wheel has traversed a preselected distance along the length of the roll face and actuating said means for moving to move the other end of said roll so as to maintain said predetermined pressure between said wheel and the roll substantially constant while the wheel traverses to said other end of the roll.

5. The arrangement of claim 4 including means for imparting a predetermined curvilinear path to said grinding wheel.

6. In a roll grinding machine having means for rotatably supporting a roll having a roll face and a grinding wheel arranged to operate on the roll; means for advancing the grinding wheel onto the roll face at one end thereof until a predetermined pressure between the wheel and roll is established, means for traversing the grinding wheel toward the other end of the roll, means for moving said other end of the roll away from the grinding wheel if the pressure therebetween exceeds the predetermined pressure, means for sensing when the grinding wheel has traversed a preselected distance along the length of the roll face, and actuating said means for moving to move said other end of the roll so as to maintain said predetermined pressure between said wheel and the roll substantially constant while the wheel traverses to said other end of the roll, and means for sensing when the wheel reaches said other end of the roll and reversing direction of movement of said grinding wheel.

7. In a roll grinding machine having means for rotatably supporting a roll having a roll face and a grinding wheel arranged to operate on the roll; means for advancing the grinding wheel onto the roll face at one end thereof, means for sensing the pressure between the wheel and roll and halting advance of the wheel when a predetermined pressure is established, means for traversing the grinding wheel toward the other end of the roll, means responsive to said sensing means for moving said other end of the roll away from the grinding wheel if the pressure therebetween exceeds the predetermined pressure, means for detecting when the grinding wheel has traversed a preselected distance along the length of the roll face and actuating said means for moving to regulate the position of the roll so as to maintain said predetermined pressure between said wheel and the roll substantially constant while the wheel traverses to said other end of the roll, and means for sensing when the wheel reaches said other end of the roll and reversing direction of movement of said grinding wheel.

8. In a roll grinding machine having means for rotatably supporting a roll having a roll face and a grinding wheel arranged to operate on the roll, means for sensing the pressure between the wheel and the roll, means for advancing the wheel onto the roll face at one end thereof until said sensing means senses a predetermined pressure, means responsive to said sensing means sensing said predetermined pressure for traversing the grinding wheel toward the other end thereof, means for moving said other end of the roll, means responsive to said sensing means while said wheel is traversing for actuating said means for moving to move said other end of the roll away from the grinding wheel if the pressure therebetween exceeds said predetermined value, means for detecting when the grinding wheel has traversed a preselected distance along the length of the roll face, means responsive to said detecting means for actuating said means for moving to regulate the position of the roll so as to maintain said predetermined pressure between said wheel and the roll substantially constant while the wheel traverses to said other end of the roll, means for sensing when the wheel reaches said other end of the roll and reversing the direction of traverse of said grinding wheel, and means responsive to reverse traverse of said grinding wheel for actuating said means for moving to move said roll until said second predetermined pressure is established, said detecting means being effective to cause said means for advancing to retract said grinding wheel when said grinding wheel has reversed traverse to said preselected distance along the length of the roll face.

9. In a roll grinding machine having means for rotatably supporting a roll having a roll face and a carriage linearly movable along said grinding machine and having mounted thereon a grinding wheel arranged to operate on the roll; apparatus for effecting alignment of the roll face with the path of travel of said carriage where one end of the roll face is closer to said carriage than the other end thereof, means for sensing the pressure between the wheel and the roll, means for advancing the wheel onto the roll face at said one end thereof until said sensing means senses a predetermined pressure, means responsive to said sensing means sensing predetermined pressure for traversing the carriage toward the other end of the roll face along said linear path, means for detecting when the carriage has traversed to a predetermined location at said other end of the roll face, and means responsive to said detecting means for moving said other end of the roll face toward said grinding wheel until said sensing means senses said predetermined pressure.

10. In a roll grinding machine having journal rests for rotatably supporting a roll having journals at the ends thereof and a face portion therebetween, one of said journal rests being movable to adjust said roll transversely of its length, means for moving said journal rest and a coordinately movable carriage having a grinding wheel thereon arranged to operate on the roll; apparatus for aligning one side of the roll face with the path of travel of the carriage along the length of the roll comprising, means for advancing the carriage and wheel onto the roll face at one end thereof until a predetermined pressure is established therebetween, means for traversing the carrage toward the other end of the roll face along a predetermined linear path, means for detecting when the grinding wheel has traversed a preselected distance along the length of the roll face, and means responsive to said detecting means for actuating said means for moving to move said one of said journal rests and said other end of said roll toward the grinding wheel until said predetermined pressure is established.

11. In a roll grinding machine having journal rests for rotatably supporting a roll having journals at the ends thereof and a face portion therebetween, one of said journal rests including means for moving said journal rest transversely of the axis of the roll, means for advancing the grinding wheel onto the roll face at one end thereof, means for sensing the pressure between the wheel and roll face and halting advance of the wheel when the wheel reaches a position where a predetermined pressure is established, means for moving said grinding wheel along the length of the roll, means for detecting when the wheel has traversed to the other end of the roll with the grinding wheel in said position, means responsive to said detecting means for moving said one of said journal rests to bring said other end of the roll face in contact with said grinding wheel and establish said same predetermined pressure therebetween.

12. The grinding machine of claim 11, further including means responsive to said sensing means for actuating said means for moving to move said journal rest and the roll away from the grinding wheel if the pressure exceeds said predetermined pressure as the grinding wheel is traversed toward said other end of the roll.

13. In a roll grinding machine having journal rests for rotatably supporting a roll having journals at the ends thereof and a face portion therebetween, one of said journal rests including means for moving said journal rests transversely of the axis of the roll, a coordinately movable grinding wheel carriage, means for advancing the grinding wheel onto the roll face at one end thereof, means for sensing the pressure between the wheel and roll face and halting advance of the wheel when a predetermined pressure is established, means for moving said carriage in a linear path along the length of the roll, means for detecting when said carriage has traversed to the other end of the roll, means responsive to said detecting means for moving said one of said journal rests to bring said other end of the roll face in contact with said grinding wheel and establish said same predetermined pressure therebetween.

14. The grinding machine of claim 13 further including means for imparting a predetermined curvilinear path to said grinding wheel as said carriage moves in said linear path along the face of the roll.

15. The grinding machine of claim 13 further including means responsive to said sensing means for actuating said means for moving to move said one of said journal rests and the roll away from the grinding wheel if the pressure exceeds said predetermined pressure as the carriage is traversed toward said other end of the roll.

16. In a roll grinding machine having journal rests for rotatably supporting a roll having journals at the ends thereof and a face portion therebetween, one of said journal rests including means for moving said journal rest transversely of the axis of the roll, means for advancing the grinding wheel onto the face of the roll at one end thereof, means for sensing pressure between the wheel and the roll face and halting advance of the wheel when the wheel reaches a position where a predetermined pressure is established, means for retracting said grinding wheel and traversing said grinding wheel along the face of the roll and returning said grinding wheel to said position where a predetermined pressure is established at the other end of the roll face, means responsive to said detecting means for moving said one of said journal rests to bring said other end of the roll face in contact with said grinding wheel in said position and establish said same predetermined pressure therebetween.

17. The roll grinding machine of claim 16 wherein said means for retracting includes means for imparting a predetermined curvilinear path to said grinding wheel as it traverses the length of the roll face.

References Cited

UNITED STATES PATENTS

| | | | |
|---|---|---|---|
| 2,168,596 | 8/1939 | Hall | 51—111 |
| 2,961,808 | 11/1960 | Dunigan | 51—165 |
| 3,088,250 | 5/1963 | Hold et al. | 51—165 |
| 3,089,293 | 5/1963 | Hoier et al. | 51—49 X |
| 3,263,374 | 8/1966 | Stuckey et al. | 51—49 X |
| 3,281,995 | 11/1966 | Parrella et al. | 51—165 |

LESTER M. SWINGLE, Primary Examiner

U.S. Cl. X.R.

51—49

PO-1050
(5/69)

UNITED STATES PATENT OFFICE
CERTIFICATE OF CORRECTION

Patent No. 3,456,395          Dated July 22, 1969

Inventor(s) A. T. Parrella

It is certified that error appears in the above-identified patent and that said Letters Patent are hereby corrected as shown below:

Column 2, lines 9 and 10, should be reversed. Column 9, line 7, "aifect" should read -- affect --. Column 10, line 37, "de-energized" should be -- de-energizes --. Column 10, line 57, "rool" should be -- roll --. Column 10, line 70, "de-energized" should be -- de-energizes --. Column 13, line 16, "MA" should read -- WA --. Column 15, line 19, "transversing" should read -- traversing --.

SIGNED AND
SEALED
MAY 19 1970

(SEAL)
Attest:
Edward M. Fletcher, Jr.
Attesting Officer

WILLIAM E. SCHUYLER, JR.
Commissioner of Patents